Dec. 31, 1940.  O. A. BENOIT  2,227,175
FIBER REMIXING MACHINE AND PROCESS
Filed Jan. 21, 1938   2 Sheets-Sheet 1
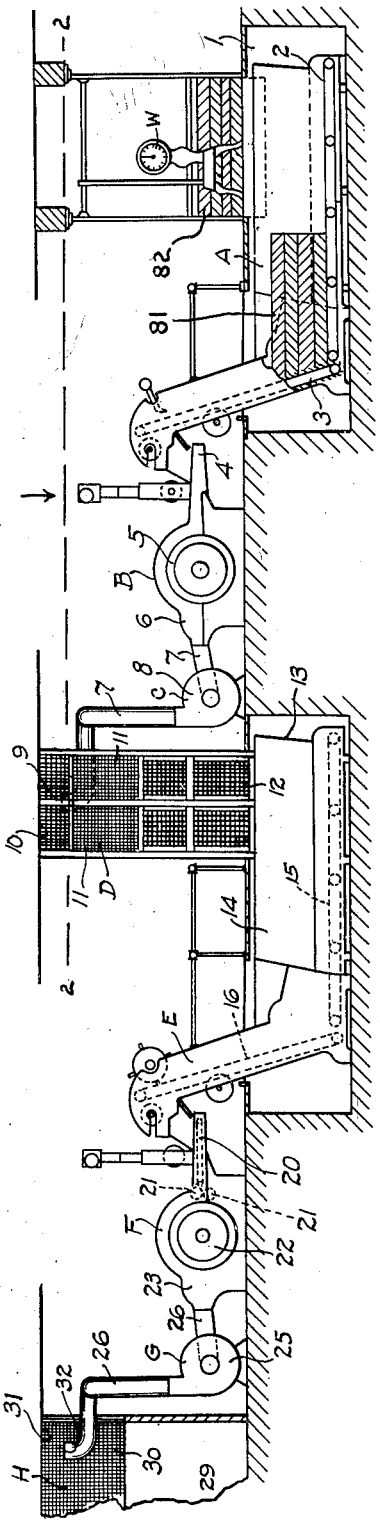
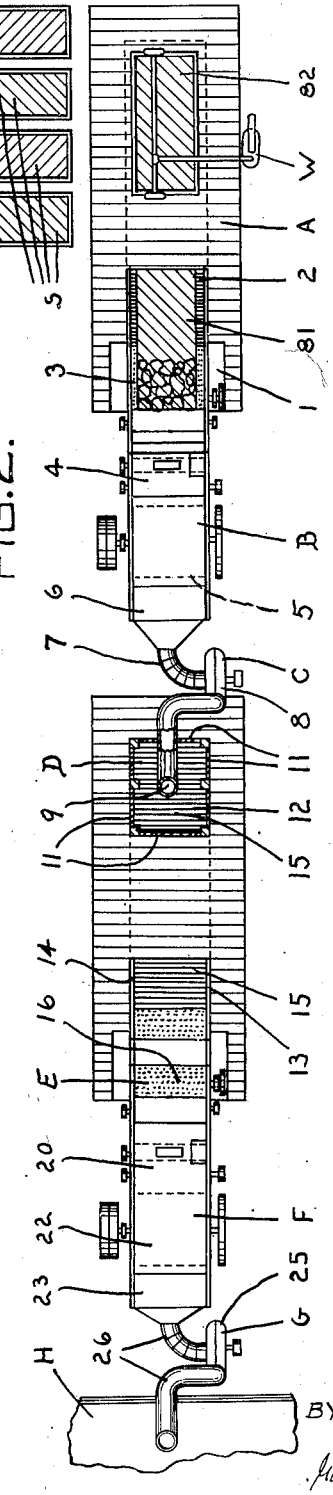
INVENTOR.
BY Oliver A. Benoit
ATTORNEY.

Dec. 31, 1940.  O. A. BENOIT  2,227,175
FIBER REMIXING MACHINE AND PROCESS
Filed Jan. 21, 1938  2 Sheets-Sheet 2

INVENTOR.
Oliver A. Benoit
BY Gardner W. Pearson
ATTORNEY.

Patented Dec. 31, 1940

2,227,175

UNITED STATES PATENT OFFICE 2,227,175

FIBER REMIXING MACHINE AND PROCESS

Oliver A. Benoit, Lawrence, Mass.

Application January 21, 1938, Serial No. 186,161

8 Claims. (Cl. 19—146)

This invention relates to machines and methods of mixing textile fibers one or more times and for preventing them from separating or unmixing after they have been mixed.

In the preparation of fibers of different colors and of different materials such as wool, cotton, and rayon, one of the early processes is to weigh the different fibers and to then assemble them in batches each with the correct proportions.

The first assembling, especially of wool, is in relatively large batches. A certain quantity of one color or quality is weighed and spread in a layer, then another and another until the whole batch is finished. Portions of this are now removed by hand and put into a mixing picker or some other mixing machine and from there the stock, after being mixed, is blown to a relatively large receiving bin with a fixed bottom on which it settles. Usually an operative with a broom or tool stays in the receiving bin and keeps it stirred up to remix different materials or different colors which have separated from the mixture and accumulated in spots on or along the sides of the bin.

Bunches of this stock are then taken by hand and put into the hopper of a feeder for a mixing picker, fearnaught or other mixing machine. From such mixing picker or machine the stock is delivered into another receiving bin with a fixed floor.

In my patent on Machine and method of mixing fibers, No. 1,929,344, October 3, 1933, I showed a machine and process in which rectangular batches in layers were placed on a conveyor apron, shown as a pit conveyor, and from this the stock was removed by a substantially vertical spiked apron and delivered to a mixing picker from which it was blown to a receiving bin.

I have found that I can mix fibers of different characteristics of floating in air by successively assembling small batches on a relatively long conveyor apron, whether it is a pit apron or some other kind, and by picking off the stock from the other end of the apron and delivering it to mixing devices and by blowing the stock from such mixing devices through a pipe into a relatively small screened receiving bin or cage located over one end of another conveyor apron which carries it along to other mixing devices, I have provided a substantially continuous process wherein the stock is thoroughly mixed and without separating is carried along continuously and again remixed one or more times so that when it is finally delivered, much time has been saved and the resulting mixture is greatly improved.

Preferably the stock is blown from a first mixing picker into a rectangular cage with an imperforate top and screened walls in such a direction that it is directed up against the top and preferably such a cage is positioned on top of one end of the walls of an elongated casing or hopper of a second picker feeder.

When blown in this way, the stock settles evenly in a rectangle on an especially long horizontal conveyor apron which forms a movable bottom for the casing or hopper.

The walls of the hopper below the cage serve to keep out air currents and, if the screening and blower means are properly proportioned, all of the air escapes through the screens while the stock smoothly and regularly drops onto the apron.

The picker feeders may be of the pit type or any other type, preferably with an extra long apron and preferably each mixing picker should be fed by a picker feeder although my process may be carried out by connecting up two mixing pickers directly in tandem, omitting one or both picker feeders.

The old system was of successive large batches, each of which was delivered to a large bin with a fixed bottom while this system is continuous and preferably in small batches, the different lots of ingredients of which are preferably separately weighed and brought together in a small batch at the beginning, although the system will work to a certain extent where the original weighing and putting together is in a large bath.

The main feature is a tandem arrangement of what I will call "mixing pickers" which term includes what is known to the trade as "fearnaughts" and also may or may not include what is known as a "picker feeder" such as is in common use to receive and to some extent turn over and over and mix stock before it is delivered to the picker proper. The usual size of a hopper of a wool picker feeder will contain perhaps fifty pounds while a mixing bin of the old type may contain from two thousand to four thousand pounds. In my system, I may use any kind of a first mixing picker but from this I blow the stock into a receiving cage, which is preferably rectangular, and is located over one end of a feeder apron, the cage preferably being set on top of a hopper or bin with imperforate sides whereby the stock, as it is delivered, drops upon the apron in comparatively equal quantities in a rectangle at one end of the apron.

As the apron is moving, this helps to mix the descending stock and if a spike apron is used, that continues the process and then if a regular mixing picker with another apron, rolls, and so forth is used, that still further mixes the stock.

With my system, rehandling stock from bins with fixed bottoms is avoided, the stock is so much better mixed that with two pickers in tandem the stock is ready for the card room and much floor space is saved. While I prefer to use a picker feeder of some type to feed all of my pickers, I can in some cases dispense with the feeders altogether.

In the drawings, Fig. 1 is a diagrammatic side elevation of the elements of my mixing system as they are preferably coupled together.

Fig. 2 is a diagrammatic plan view or sectional view as on the line 2, 2 of Fig. 1.

In Figs. 1 and 2 stock is shown in the first mixer but no stock in the second set of mixing devices.

Figure 3:
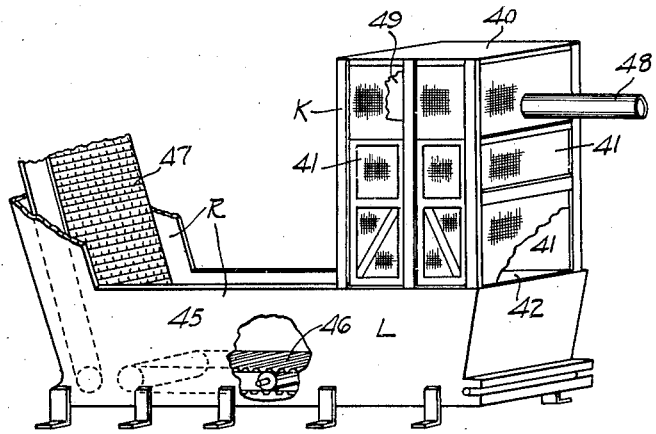
Fig. 3 is an isometric view of a slightly different or modified element of the system.

In the drawings, A represents a mixing picker feeder which, as shown, is what is known as a pit feeder. It includes a casing or hopper 1 in a pit at the bottom of which is a conveyor apron 2, at one end of which is weighing means W by the use of which a batch of fibers can be placed on one end of apron 2. 3 is a lifting or spiked apron arranged to continuously remove the stock from the apron 2 and to deliver it to the horizontal feed apron 4 of a first mixing picker B.

This mixing picker B may be of any well-known type for pulling apart and mixing the stock. It includes the usual toothed cylinder 5 and it delivers the mixed stock into a chamber 6 which is connected with one end of blower means C. Blower means C includes a pipe 7 extending from chamber 6 to and into a cage D in which it is bent upward at 9, and a fan 8.

The feeder A and picker B are substantially the same as those shown in my United States Letters Patent No. 1,929,344 of October 3, 1933.

The blowing means C carries the mixed stock from chamber 6 through pipe 7 and bend 9 into cage D, delivering it near the top and preferably against the top 10.

This cage D, as shown, is of rectangular shape with an imperforate top and with vertical, rectangular screened walls 11, 11. The bottom part of these walls may be imperforate but there should be enough screening or perforations near the top to release substantially all of the air delivered by the blower means C. As shown, the bottom 12 of cage D is open and rests on the walls 13 of the casing or hopper 14 of a second picker feeder E in a pit over one end of its conveyor apron 15.

The walls of the casing or hopper 14 serve to keep the air currents from interfering with the operation of the cage or from stirring up the stock when it has been deposited on apron 15.

The second picker feeder E includes the spiked apron 16 to continuously remove the stock from conveyor apron 15 and to deliver it to a second mixing picker F.

This second mixing picker F is similar to B and includes a horizontal feed apron 20, rolls 21, 21 and toothed cylinder 22 which delivers the stock to a chamber 23 from which it is removed by a second blower means G which includes a fan 25 and a pipe 26 leading from chamber 23 into a second screened receiving cage H. This second screened cage H may be one of the large settling bins such as used in card rooms, the lower part 29 of the walls being imperforate and the upper part 30 being screened while the top 31 may be the top of the room and, therefore, imperforate. Preferably, the end 32 of the pipe 26 is bent upward so as to deliver the stock up against the top of this cage or bin H.

In the drawings, S represents a plurality of boxes or piles of fibrous stock of different colors or characteristics and 81 represents one batch of stock which has been duly assembled, as by weight, and placed on the first feeder apron 2, while 82 represents a batch which is being assembled, by weight, about to be dropped on apron 2 following the preceding batch.

In Fig. 3 is shown a receiving cage K of rectangular shape with a rectangular imperforate top 40 and four screened walls such as 41 and an open bottom 42. The top 40 and open bottom 42 of this cage K, as shown, are of such a size that the cage rests on the walls 45 and covers one end of the elongated hopper R of a picker feeder L. Cage K is positioned over one end of the conveyor apron 46 which travels along the bottom of hopper R and carries the stock to the spiked apron 47 by which it is lifted and delivered to a second mixing picker which is not shown.

The stock from the first picker is blown directly into cage K through a horizontal pipe 48, as shown, against a baffle plate 49 near the top of the opposite wall.

Figure 4:
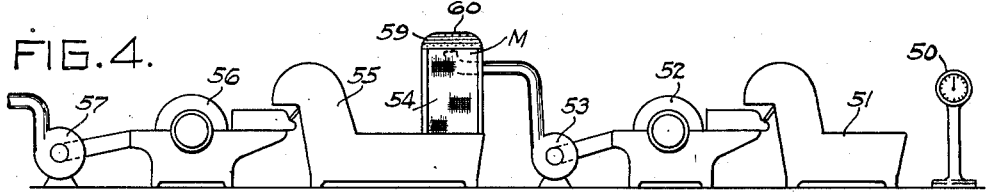
Fig. 4 is a diagrammatic side elevation showing another manner in which the elements can be coupled together in my system.

In Fig. 4 is shown a series of picker feeders, each with an extra long hopper arranged in tandem with a first and second mixing picker, the stock being blown from the first mixing picker into a cage positioned over one end of the hopper of the second picker feeder and of the conveyor apron therein.

50 represents the weighing device for weighing stock to be delivered into a first picker feeder 51 which delivers to a first mixing picker 52 from whence, by blower means 53, the stock is blown into a cage M over the end of the hopper of the second picker feeder 55 and this picker feeder delivers the stock to the second mixing picker 56 from which it is blown by blower means 57 either to a stationary cage associated with a storage bin or it may be blown to still another picker feeder.

The cage M is of what might be called the "dome type" as it has four rectangular screened sides 54 and above these the curved sides 59 and an imperforate top 60. The stock is blown in, in the desired direction above the hopper 55 and this hopper is shown as more than twice the length of cage M.

Figure 5:
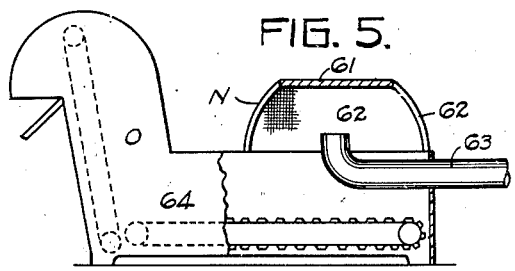
Figs. 5 and 6 are side elevations with parts broken away showing modifications of some of the elements of my system.

In Fig. 5 the cage N is not as high but has the rectangular imperforate top 61 and the outwardly and downwardly curved screened sides 62, while the stock is blown in and up by the pipe 63, the cage N being about two-thirds the length of hopper 64 of the picker feeder O.

Figure 6:
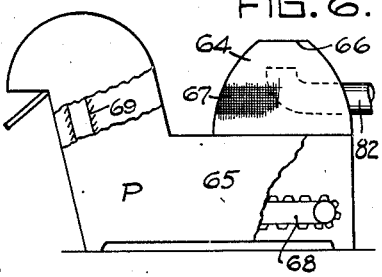

In Fig. 6, the cage 64 has a rectangular imperforate top 66 and its four sides such as 67 all are perforated or foraminous and curve out and down to the top of hopper 65 of a picker feeder P which it almost completely covers. At the sides and back feed apron 68 and the spiked apron 69 are inclosed, and the stock cannot escape after it is blown in by a pipe 82 from any previous stock mixing device.

Figure 7:
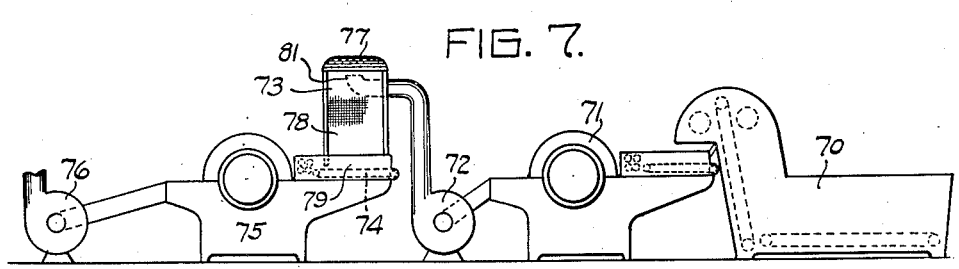
Fig. 7 is a diagrammatic side elevation showing another method of coupling together the members of my system.

As shown in Fig. 7, I can start the stock in any kind of a picker feeder such as 70, preferably with an extra long hopper, and can deliver to a first mixing picker 71 and from thence by blower means 72, blow the stock to a cage 73 which rests directly over the food apron 74 of a second mixing picker 75 from which the stock is blown by blower means 76 to a storage bin or to another cage.

The receiving cage 73, as shown, is of rectangular shape with an imperforate top 77 and four screened walls 78 and rests upon the side walls 79 of the second mixing picker 75 over one end of its feed apron 74. The end 81 of the pipe from blower 72 which enters cage 73 is bent upward so that the stock impinges on the imperforate top 77 of the cage.

In this tandem arrangement the feeder for the second mixing picker is entirely omitted.

In some of the claims, the term "mixing machine" is used to include a picker feeder associated with a mixing picker but it is intended to be general enough to include the various types of pickers alone and perhaps other types of fiber mixing machines.

I claim:

1. In a fiber mixing system, the combination of a first picker feeder including a casing with imperforate walls and a horizontal conveyor apron at the bottom, said feeder including means at one end to continuously remove the stock and to deliver it to a first mixing picker, and means at the other end to place a batch of fibers on the other end of the apron; with said first mixing picker which includes a feed apron; a second picker feeder including a casing with three imperforate walls and a second conveyor apron at the bottom; a first rectangular screened receiving cage with an imperforate top, a screen in one wall and an open bottom, said cage being positioned on the walls of the casing over one end of said second conveyor apron; means to blow the stock from the first mixing picker to the first receiving cage and up against its imperforate top; means at the other end of the conveyor apron of the second picker feeder to continuously remove the stock and to deliver it to a second mixing picker; said second mixing picker; a second screened receiving cage having an imperforate top and a screen in one of its walls; and means to blow the stock from the second mixing picker into the second receiving cage and up against its imperforate top.

2. In a fiber mixing system, the combination of a first picker feeder including means to deliver stock to a first mixing picker; with said first mixing picker which includes a feed apron; a second picker feeder including a casing with three imperforate walls and a conveyor apron at the bottom; a first rectangular screened receiving cage with an imperforate top, a screen in one wall and an open bottom, said cage being positioned on the walls of the casing of the second picker feeder over one end of its conveyor apron; means to blow the stock from the first mixing picker to the first receiving cage and up against its imperforate top; means at the other end of the conveyor apron of the second picker feeder to continuously remove the stock and to deliver it to a second mixing picker; a second screened receiving cage having an imperforate top and a screen in one of its walls; and means to blow the stock from the second mixing picker into the second receiving cage and up against its imperforate top.

3. In a fiber mixing system, the combination of a first picker feeder including means to deliver stock to a first mixing picker; with said first mixing picker which includes a feed apron; a mixing machine including a casing with three imperforate walls and a conveyor apron at the bottom; a substantially rectangular screened receiving cage screened on all sides and with an imperforate top, said cage being positioned on the walls of the casing over one end of its conveyor apron; and means to blow stock from the mixing picker into the receiving cage and up against its imperforate top.

4. The combination with a first fiber mixing machine; of a second mixing machine, including a casing with three imperforate walls and a conveyor apron at the bottom; a substantially rectangular screened receiving cage screened on all sides and with an imperforate top, said cage being positioned on the walls of the casing over one end of the conveyor apron; and means to blow stock from the first mixing machine into the receiving cage and up against its imperforate top.

5. The combination with a first fiber mixing machine; of a second mixing machine, including a casing with imperforate walls and a conveyor apron at the bottom; a receiving cage having such screens on its sides that air will pass out equally in substantially opposite directions, an imperforate top and an open bottom positioned on the walls of the casing over one end of the conveyor apron; and means to blow stock from the first mixing machine into the receiving cage and up against its imperforate top.

6. The combination with a first fiber mixing picker; of a second mixing machine, including a casing with imperforate walls and a conveyor apron at the bottom; a receiving cage having such screens on its sides that air will pass out equally in substantially opposite directions, an imperforate top and an open bottom positioned on the walls of the casing over one end of the conveyor apron; and means to blow stock from the first mixing picker into the receiving cage and up against its imperforate top, whereby the air will escape equally through the screens but the stock will settle evenly on the conveyor apron between the imperforate walls of the casing.

7. The combination with a first fiber mixing picker; of a second mixing machine, including a casing with imperforate walls and a conveyor apron at the bottom; a receiving cage having such screens on its sides that air will pass out equally in substantially opposite directions through the screens; an imperforate top and an open bottom positioned on the walls of the casing over one end of the conveyor apron; and means to blow stock from the first mixing picker into the receiving cage and up against its imperforate top.

8. The process of mixing fibers of different characteristics of floating in air which consists of placing layers of such different fibers one on top of the other; of moving such layers continuously against means for continuously removing and mixing stock from the end to form a bat; of continuously removing and mixing a line of fibers from the end of the hat and of so blowing such fibers that they will settle in dead air over an endless carrier, whereby the dropping fibers overlap and are continuously mixed; of continuously removing and mixing fibers from the end of this bat and forming another bat; and of again continuously removing and mixing the fibers from the end of that bat in a line and of so blowing the fibers from there that they will settle in dead air without unmixing.

OLIVER A. BENOIT.